US012539710B2

(12) United States Patent
Takahama et al.

(10) Patent No.: US 12,539,710 B2

(45) Date of Patent: Feb. 3, 2026

(54) LIQUID JET HEAD, LIQUID JET RECORDING DEVICE, AND METHOD OF MANUFACTURING LIQUID JET HEAD

(71) Applicant: SII Printek Inc., Chiba (JP)

(72) Inventors: Yuichi Takahama, Chiba (JP); Kenji Suzuki, Chiba (JP); Nobuhiro Kawakami, Chiba (JP); Takuma Yanagisawa, Koshigaya (JP)

(73) Assignee: SII PRINTEK INC., Chiba (JP)

( * ) Notice: Subject to any disclaimer, the term of this patent is extended or adjusted under 35 U.S.C. 154(b) by 166 days.

(21) Appl. No.: 18/238,228

(22) Filed: Aug. 25, 2023

(65) Prior Publication Data

US 2024/0066902 A1 Feb. 29, 2024

(30) Foreign Application Priority Data

Aug. 29, 2022 (JP) ................................. 2022-135679

(51) Int. Cl.

*B41J 2/045* (2006.01)
*B41J 2/14* (2006.01)
*B41J 29/377* (2006.01)

(52) U.S. Cl.

CPC ......... *B41J 29/377* (2013.01); *B41J 2/04515* (2013.01); *B41J 2/04581* (2013.01); *B41J 2/1408* (2013.01); *B41J 2/14201* (2013.01); *B41J 2202/08* (2013.01)

(58) Field of Classification Search

CPC .... B41J 2/04531; B41J 2/0454; B41J 2/1408; B41J 29/377; B41J 2002/14354; B41J 2202/08; B41J 2/04515; B41J 2/04581; B41J 2/14201; B41J 2/17509; B41J 2/18; B41J 2/1601; B41J 29/13; B41J 29/02

See application file for complete search history.

(56) References Cited

U.S. PATENT DOCUMENTS

| | | | |
|---|---|---|---|
| 4,579,469 | A | 4/1986 | Falcetti |
| 2019/0092017 | A1 | 3/2019 | Yamanaka et al. |
| 2019/0126649 | A1 | 5/2019 | Midorikawa et al. |
| 2019/0315138 | A1 | 10/2019 | Iijima et al. |

FOREIGN PATENT DOCUMENTS

| | | | |
|---|---|---|---|
| EP | 2921300 | A1 | 9/2015 |
| JP | 2019-084704 | A | 6/2019 |

OTHER PUBLICATIONS

Extended European Search Report in Europe Application No. 231922444, dated Jan. 30, 2024, 9 pages.

*Primary Examiner* — Kristal Feggins

(74) *Attorney, Agent, or Firm* — Crowell & Moring LLP

(57) ABSTRACT

A cooling efficiency is increased. An inkjet head is provided with a head main body for jetting ink, a cooling pipe which has corrosion resistance to the ink, and through which the ink for cooling a drive circuit passes, and a cooling member which has higher thermal conductivity than that of the cooling pipe, in which at least a part of the cooling pipe is embedded, and which has recessed parts in at least a part of a portion surrounding the cooling pipe.

13 Claims, 10 Drawing Sheets

LIQUID JET HEAD, LIQUID JET RECORDING DEVICE, AND METHOD OF MANUFACTURING LIQUID JET HEAD

RELATED APPLICATIONS

This application claims priority to Japanese Patent Application No. JP2022-135679 filed on Aug. 29, 2022, the entire content of which is incorporated herein by reference.

BACKGROUND OF THE INVENTION

1. Field of the Invention

The present disclosure relates to a liquid jet head, a liquid jet recording device, and a method of manufacturing a liquid jet head.

2. Description of the Related Art

In JP2019-84704A, there is disclosed a liquid jet head provided with a liquid jet head chip for jetting a liquid, and a cooling section including a cooling medium flow channel through which a cooling medium passes.

The cooling section has a cooling pipe forming the cooling medium flow channel, and a cooling plate having contact with an outer surface of the cooling pipe. The cooling pipe is sandwiched by a pair of cooling plates.

However, in the case of a configuration of sandwiching the cooling pipe with the pair of cooling plates, there is a high possibility that a gap occurs between the cooling pipe and the cooling plates. When the gap occurs between the cooling pipe and the cooling plates, it becomes difficult for the heat to be transferred from the cooling pipe to the cooling plates, and there is a possibility that the cooling efficiency decreases.

The present disclosure is made in view of the problem described above, and has an object of increasing the cooling efficiency.

SUMMARY OF THE INVENTION (1) A liquid jet head according to an aspect of the present disclosure includes a jet section configured to jet liquid, a cooling pipe which has corrosion resistance to the liquid, and through which a cooling medium configured to cool a heat source passes, and a cooling member which has higher thermal conductivity than thermal conductivity of the cooling pipe, in which at least a part of the cooling pipe is embedded, and which has at least one recessed part in at least a part of a portion surrounding the cooling pipe.

According to the liquid jet head related to the present aspect, there is provided the cooling member in which at least a part of the cooling pipe is embedded, and thus, the gap is difficult to occur between the cooling pipe and the cooling member, and therefore, it becomes easy to transfer the heat from the cooling pipe to the cooling member. Therefore, it is possible to increase the cooling efficiency.

In addition, a portion corresponding to a pipe supporting part (a part for supporting the cooling pipe) of a mold when performing molding appears as the recessed part of the cooling member. Therefore, it is possible to prevent a misalignment and a deformation when performing the molding.

(2) In the liquid jet head according to the aspect (1), the cooling pipe can be insert-molded with respect to the cooling member.

According to this configuration, since it is difficult to generate a gap between the cooling pipe and the cooling member due to the insert molding, it becomes easy to transfer the heat from the cooling pipe to the cooling member. Therefore, it is possible to increase the cooling efficiency.

(3) In the liquid jet head according to the aspect (2), the recessed parts can respectively open toward four directions crossing a central axis of the cooling pipe.

According to this configuration, the portion corresponding to the pipe supporting part of the mold when performing the molding appears as the recessed parts opening toward the four directions in the cooling member. Therefore, it is possible to more effectively prevent the misalignment and the deformation when performing the molding.

(4) In the liquid jet head according to the aspect (3), the cooling member can have a partition part configured to partition the recessed parts respectively opening toward the four directions.

According to this configuration, even when the cooling member has the recessed parts opening toward the four directions, it is possible to ensure the heat transfer paths in the partition part, and therefore, it is possible to more effectively increase the cooling efficiency.

(5) In the liquid jet head according to any one of the aspects (1) to (4), the recessed part can include a curved part curved toward the cooling pipe.

For example, when there is a gap between the pipe supporting part of the mold and the cooling pipe when performing the molding, there is a possibility that burrs occur due to the molten metal flowing through the gap. In this case, when the recessed part has the curved part curved along the cooling pipe, it becomes easy to increase the contact portion (form the surface contact) between the pipe supporting part of the mold and the cooling pipe when performing the molding, and therefore, there is a high possibility that the burrs occur. In contrast, according to the present configuration, since the recessed part has the curved part curving toward the cooling pipe, it is possible to reduce the contact portion (form line contact or point contact) between the pipe supporting part of the mold and the cooling pipe when performing the molding. Therefore, it is possible to prevent the burrs from occurring.

(6) In the liquid jet head according to any one of the aspects (1) to (5), the cooling member can have at least one heat source arrangement surface on which the heat source is arranged, and the heat source arrangement surface can be disposed in a portion other than the recessed part in the cooling member.

According to this configuration, since it is possible to make the heat source have contact with the heat source arrangement surface of the cooling member, it is possible to more effectively increase the cooling efficiency.

(7) In the liquid jet head according to the aspect (6), the heat source arrangement surface can be a plane.

According to this configuration, since it is possible to increase the contact area between the heat source and the heat source arrangement surface when a plane is included in the outer surface of the heat source, it is possible to more effectively increase the cooling efficiency.

(8) In the liquid jet head according to the aspect (6) or (7), the cooling member can have a first surface and a second surface which are arranged at respective sides opposite to each other across the cooling pipe, and the heat source arrangement surface can be provided to each of the first surface and the second surface.

According to this configuration, since it is possible to make the heat source have contact with each of the first surface and the second surface of the cooling member when disposing a plurality of heat sources, it is possible to more effectively increase the cooling efficiency.

(9) In the liquid jet head according to any one of the aspects (1) to (8), an end portion of the cooling pipe can be arranged outside an outer shape of the cooling member.

According to this configuration, since it is possible to hold the end portion of the cooling pipe when performing the molding, it is possible to prevent the misalignment and the deformation.

(10) In the liquid jet head according to any one of the aspects (1) to (9), the cooling pipe can have a straight pipe shape.

According to this configuration, it is easy to ensure the dimensional accuracy of the cooling pipe compared to when the cooling pipe has a curved shape, and thus, it is possible to achieve reduction in manufacturing cost.

(11) In the liquid jet head according to any one of the aspects (1) to (10), the cooling pipe can be formed of stainless steel, and the cooling member can be formed of aluminum pure metal or aluminum alloy.

According to this configuration, when the liquid passes through the cooling pipe, it is possible to obtain high cooling efficiency while avoiding the corrosion by the liquid.

(12) In the liquid jet head according to any one of the aspects (1) to (11), the cooling pipe can branch from a liquid flow channel through which the liquid passes, and can have a cooling flow channel through which the liquid passes as the cooling medium.

According to this configuration, it is possible to supply the liquid to the liquid flow channel, and at the same time, supply the liquid to the cooling flow channel as the cooling medium.

(13) A liquid jet head according to an aspect of the present disclosure includes a jet section configured to jet liquid, a cooling pipe which has corrosion resistance to the liquid, and through which a cooling medium configured to cool a heat source passes, and a cooling member which has higher thermal conductivity than thermal conductivity of the cooling pipe, and in which at least a part of the cooling pipe is insert-molded.

According to the liquid jet head related to the present aspect, since it is difficult to generate a gap between the cooling pipe and the cooling member due to the insert molding, it becomes easy to transfer the heat from the cooling pipe to the cooling member. Therefore, it is possible to increase the cooling efficiency.

(14) A liquid jet recording device according to an aspect of the present disclosure includes the liquid jet head according to any one of the aspects (1) to (13), and a carriage to which the liquid jet head is attached.

According to the liquid jet recording device related to the present aspect, it is possible to obtain the liquid jet recording device capable of increasing the cooling efficiency of the liquid jet head.

(15) A method of manufacturing a liquid jet head according to an aspect of the present disclosure includes providing a jet section configured to jet liquid, providing a cooling pipe which has corrosion resistance to the liquid, and through which a cooling medium configured to cool a heat source passes, and providing a cooling member having higher thermal conductivity than thermal conductivity of the cooling pipe, wherein in the providing the cooling member, molding is performed in a state of supporting the cooling pipe.

According to the method of manufacturing the liquid jet head related to the present aspect, the molding is performed in the state of supporting the cooling pipe, and thus, the gap is difficult to occur between the cooling pipe and the cooling member, and therefore, it becomes easy to transfer the heat from the cooling pipe to the cooling member. Therefore, it is possible to increase the cooling efficiency. In addition, it is possible to prevent the misalignment and the deformation when performing the molding.

DETAILED DESCRIPTION OF THE PREFERRED EMBODIMENTS

An embodiment according to the present disclosure will hereinafter be described with reference to the drawings.

In the embodiment and a modified example described hereinafter, constituents corresponding to each other are denoted by the same reference symbols, and the description thereof will be omitted in some cases. Further, in the following description, expressions representing relative or absolute arrangement such as "parallel," "perpendicular," "center," and "coaxial" not only represent strictly such arrangements, but also represent the state of being relatively displaced with a tolerance, or an angle or a distance to the extent that the same function can be obtained.

[Printer 1]

Figure 1:
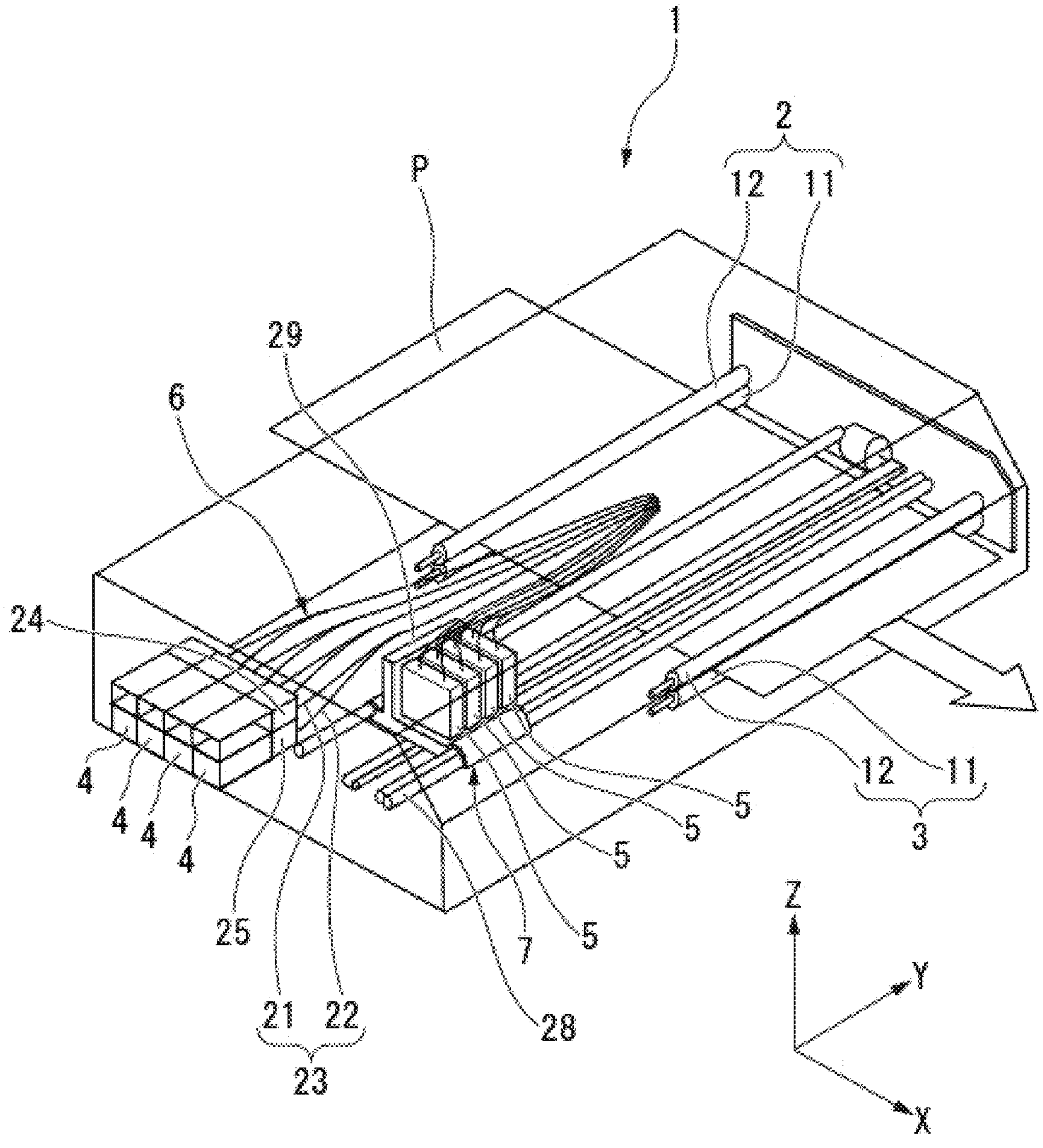
FIG. 1 is a schematic configuration diagram of a printer according to an embodiment.

FIG. 1 is a schematic configuration diagram of a printer 1 according to the embodiment.

As shown in FIG. 1, the printer 1 (a liquid jet recording device) according to the present embodiment is provided with a pair of conveying mechanisms 2, 3, ink tanks 4, inkjet heads 5 (liquid jet heads), ink circulation mechanisms 6, and a scanning mechanism 7.

In the following explanation, the description is presented using an orthogonal coordinate system of X, Y, and Z as needed. An X direction is a conveying direction (a sub-scanning direction) of a recording target medium P (e.g., paper). A Y direction is a scanning direction (a main-scanning direction) of the scanning mechanism 7. A Z direction is a height direction (a gravitational direction) perpendicular to the X direction and the Y direction.

Further, in the following explanation, the description will be presented defining an arrow side as a positive (+) side, and an opposite side to the arrow as a negative (−) side in the drawings in each of the X direction, the Y direction, and the Z direction. In the present embodiment, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction. There is disposed a plurality of ink tanks 4 which respectively contain ink of four colors such as yellow, magenta, cyan, and black.

There are disposed a plurality of inkjet heads 5 which are configured so as to be able to respectively eject the four colors of ink, namely the yellow ink, the magenta ink, the cyan ink, and the black ink in accordance with the ink tanks 4 coupled thereto.

Figure 2:
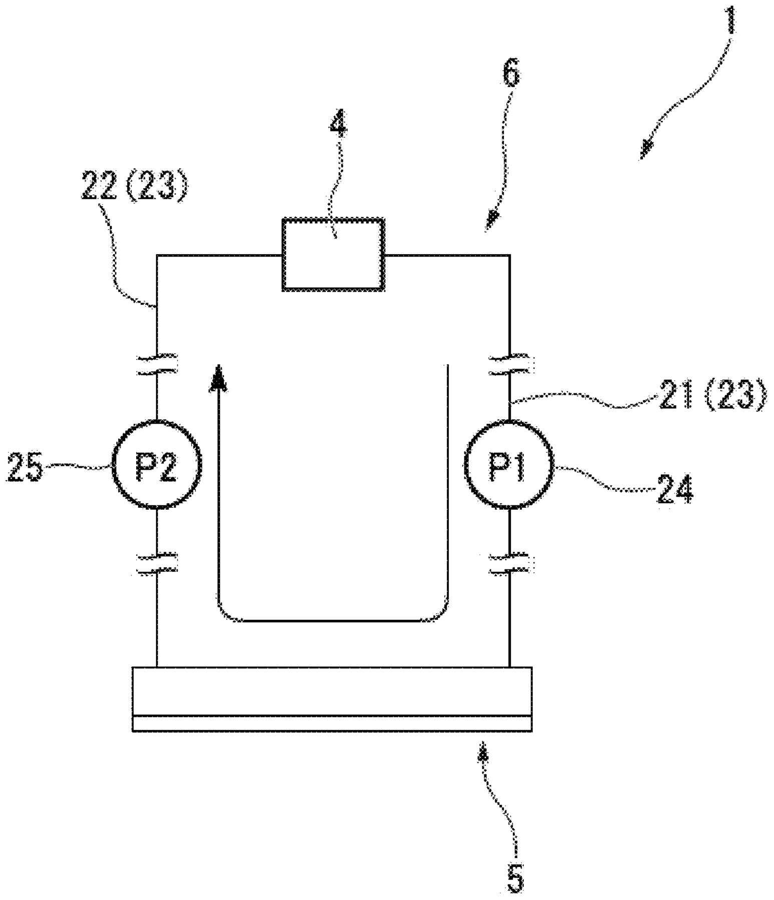
FIG. 2 is a schematic configuration diagram of an inkjet head and an ink circulation mechanism according to the embodiment.

FIG. 2 is a schematic configuration diagram of the inkjet head 5 and the ink circulation mechanism 6 related to the embodiment.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the ink jet head 5. The ink circulates between the inkjet head 5 and the ink tank 4 through the circulation flow channel 23 due to drive of the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, a carriage 29 movably supported by the guide rail 28, and a drive device for moving the carriage 29. The drive device is constituted by, for example, a motor, a pulley, and a belt.

<Inkjet Heads 5>

The inkjet heads 5 are mounted on the carriage 29. The inkjet heads 5 according to the present embodiment are each an inkjet head of an electromechanical transduction system in which ink is ejected from a head chip including an actuator plate formed of a piezoelectric element made of PZT (lead zirconate titanate) or the like.

In this inkjet head 5, in order to eject the ink, a voltage is applied between electrodes on drive walls of an ejection channel provided to the actuator plate to cause the drive wall to make a thickness-shear deformation. Thus, due to a change in volume of the ejection channel, the ink in the ejection channel is ejected through a nozzle hole. It should be noted that an ejection system of the liquid is not limited to the electromechanical transduction system described above, and it is possible to adopt a charge control system, a pressure vibration system, an electrothermal transduction system, an electrostatic suction system, and so on.

The charge control system is for providing a charge to a material with a charge electrode to eject the material from a nozzle while controlling a flight direction of the material with a deflection electrode. Further, the pressure vibration system is for applying super high pressure to a material to eject the material toward a nozzle tip, and when a control voltage is not applied, the material goes straight to be ejected from the nozzle, and when the control voltage is applied, an electrostatic repelling force is generated between the materials, and the material flies in all directions to be prevented from being ejected from the nozzle.

Further, the electrothermal transduction system is for rapidly vaporizing a material with a heater provided in a space retaining the material to generate a bubble, to eject the material located in the space with the pressure of the bubble. The electrostatic suction system is for applying minute pressure to a space retaining a material to form a meniscus of the material in the nozzle, applying an electrostatic attractive force in this state, and then pulling the material out. Further, besides the above, it is possible to adopt technologies such as a system using a viscosity alteration of a fluid due to an electric field, or a system of flying a material with a discharge spark.

Figure 3:
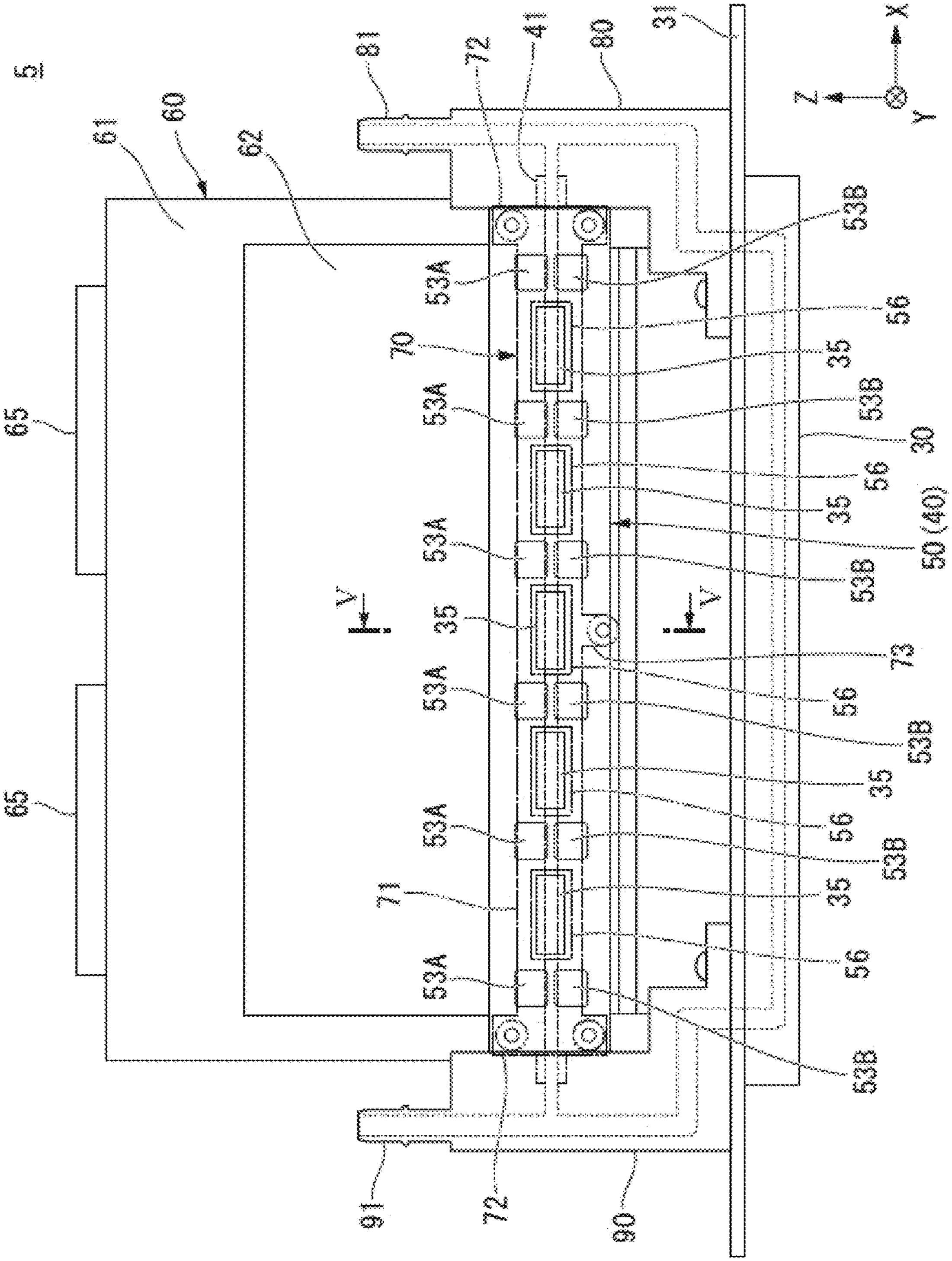
FIG. 3 is a front view of the inkjet head according to the embodiment.
Figure 4:
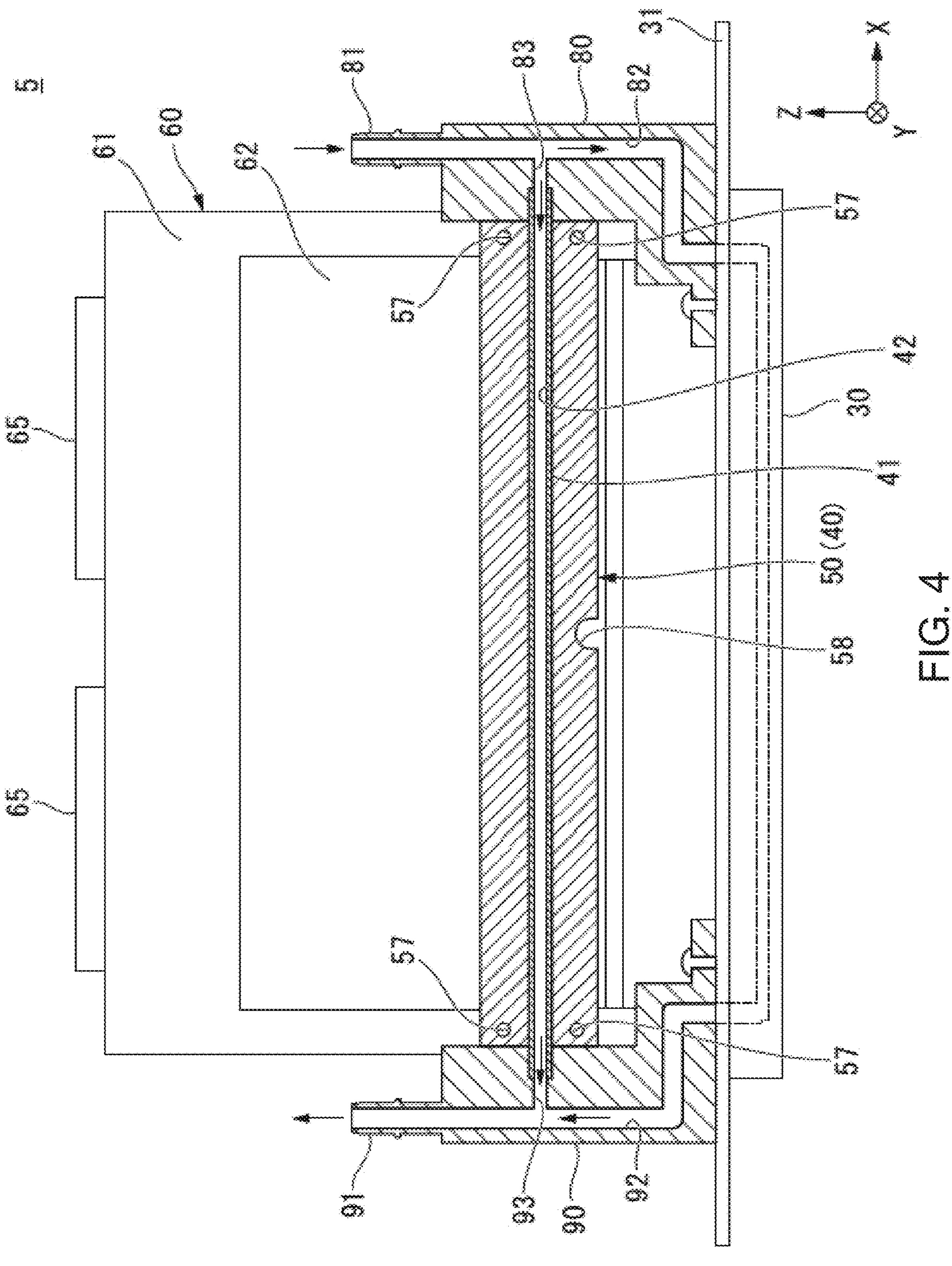
FIG. 4 is a cross-sectional view for explaining a flow of ink related to the embodiment.
Figure 5:
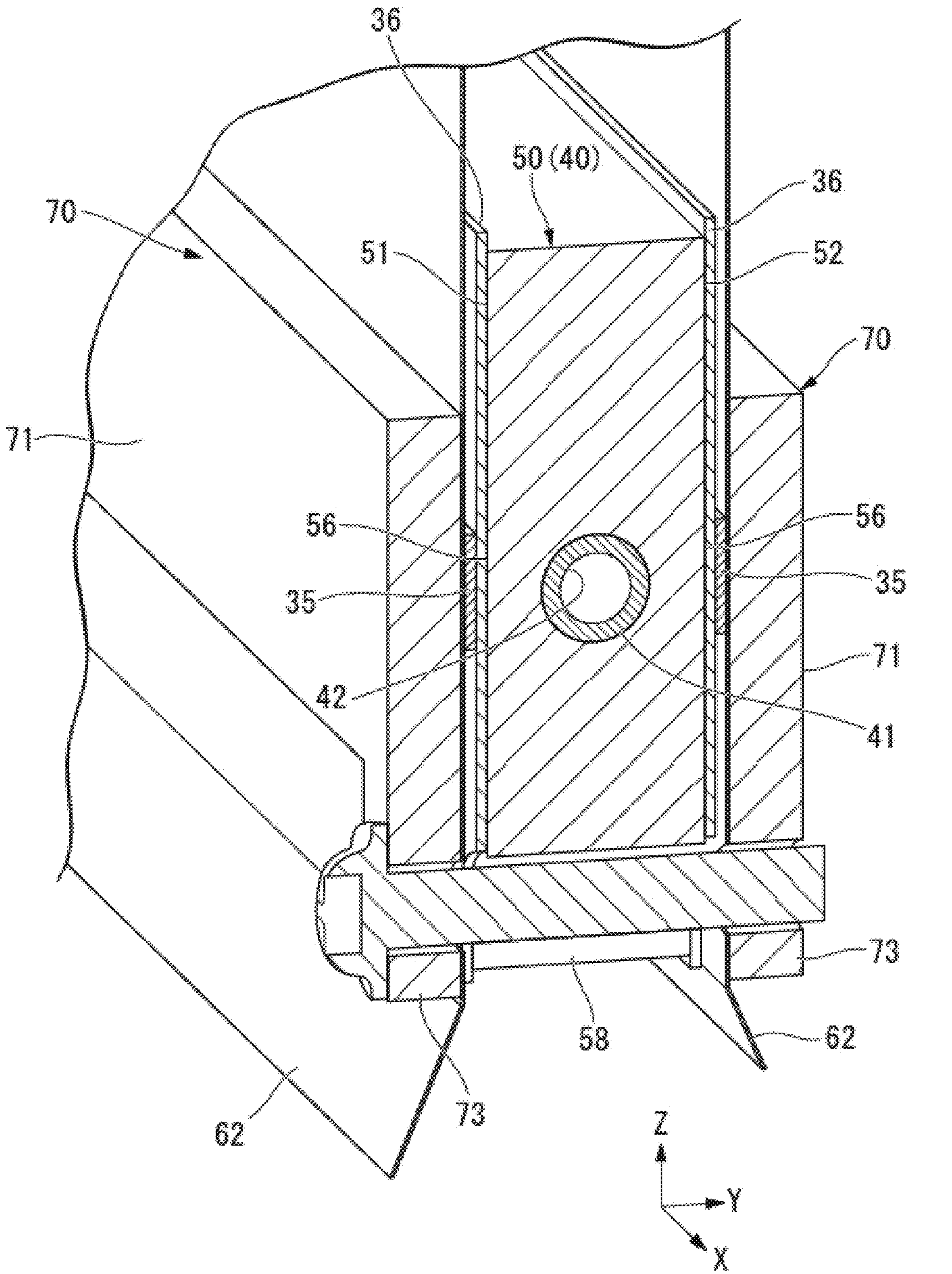
FIG. 5 is a cross-sectional perspective view along an arrow V-V shown in FIG. 3.

FIG. 3 is a front view of the inkjet head 5 according to the embodiment. FIG. 4 is a cross-sectional view for explaining a flow of the ink related to the embodiment. FIG. 5 is a cross-sectional perspective view along an arrow V-V shown in FIG. 3.

As shown in these drawings, the inkjet head 5 is provided with a head main body 30 (a jet section) for jetting the ink, a cooling pipe 41 through which the ink (a cooling medium) for cooling a drive circuit 35 (a heat source) passes, and a cooling member 50 in which at least a part of the cooling pipe 41 is embedded.

[Head Main Body 30]

The head main body 30 has a rectangular box-like shape. On a lower surface of the head main body 30, there is disposed a nozzle array not shown for jetting the ink. The head main body 30 is supported by a base member 31 to be installed in the carriage 29. The base member 31 is formed so as to be longer in the X direction than the head main body 30. On a lower surface of the base member 31, there is formed an elongated hole not shown for exposing the nozzle array of the head main body 30.

[Drive Circuit 35]

The drive circuit 35 is a driver IC for controlling, for example, an operation of the head main body 30 and an operation of the circulation mechanism. The drive circuit 35 has thermal contact with the cooling member 50. In the example shown in the drawing, the drive circuit 35 has indirect contact with the cooling member 50 via an insulating member 36. The insulating member 36 is a sheet-like member formed of an insulating material such as silicon. It should be noted that the heat source is not limited to the drive circuit 35 such as a drive IC. The heat source is only required to be what generates heat due to drive, and can be another electronic component.

[Board Unit 60]

The inkjet head 5 is provided with a board unit 60 on which the drive circuit 35 is mounted. The board unit 60 is provided with a board main body 61 on which a plurality of electric circuits are mounted, and a flexible board 62 for electrically coupling the board main body 61 and drive circuits (electrodes on the drive walls) of the actuator plate described above.

The board main body 61 is, for example, a rigid board. The board main body 61 is coupled to the cooling member 50 and so on via a coupling member not shown. In an upper part of the board main body 61, there are disposed connectors 65. The board main body 61 is electrically coupled to a main controller, a power supply, and so on located outside via the connectors 65.

It should be noted that the board main body 61 can be a flexible board. In this case, it is possible to extend a part of the board main body 61 to an outside of the inkjet head 5 to directly be coupled to the printer 1 without providing the connectors 65 to the board main body 61.

The flexible board 62 extends obliquely downward so as to get away in the Y direction from the board main body 61. The part extending obliquely downward in the flexible board 62 is coupled to the drive electrodes of the actuator plate described above.

On the flexible board 62, there are mounted a plurality of drive circuits 35 in a straight line at intervals in the X direction. The drive circuit 35 is a driver IC, and is high in amount of heat generation. Therefore, there are disposed support members 70 for receiving heat from the drive circuits 35. In FIG. 3, the support members 70 are represented by dashed-two dotted lines.

[Support Member 70]

The support members 70 are formed of a material excellent in thermal conductivity and radiation performance such as aluminum. The support members 70 are disposed as a pair of members in the Y direction via the cooling member 50 and so on. The support members 70 are each provided with a main body portion 71 extending in the X direction, end side fixation portions 72 disposed in both end portions in the X direction of the main body portion 71, and a lower middle fixation portion 73 disposed at a lower side of a central portion in the X direction of the main body portion 71.

The main body portion 71 is formed to have a plate-like shape. The main body portion 71 is opposed to the drive circuits 35 in the Y direction via the flexible board 62. The main body portion 71 has thermal contact with the drive circuits 35.

The end side fixation portions 72 extend toward both sides in the Z direction from the both end portions of the main body portion 71. The pair of support members 70 are screwed in the respective end side fixation portions 72 via through holes 57 of the cooling member 50.

The lower middle fixation portion 73 extends toward the −Z side from a lower side of the central portion in the X direction of the main body portion 71. The pair of support members 70 are screwed in the respective lower middle fixation portions 73 via a lower middle recessed part 58 of the cooling member 50.

[Flow Channel Members 80, 90]

The inkjet head 5 is provided with an entrance side flow channel member 80 and an exit side flow channel member 90. The flow channel members are each formed of a resin material such as polyethylene, polycarbonate, polypropylene, polyethylene terephthalate, or polyphenylene sulfide. Each of the flow channel members 80, 90 is formed to have an L shape.

The entrance side flow channel member 80 is disposed at one side (the +X side) in the X direction of the inkjet head 5. The entrance side flow channel member 80 is provided with an entrance port 81 to which the ink supply tube 21 described above is coupled. The entrance side flow channel member 80 is attached to one side (the +X side) in the X direction of the head main body 30 via a fastener member such as a bolt.

The entrance side flow channel member 80 has a first inflow branch channel 82 and a second inflow branch channel 83 branching from an inflow channel into which the ink inflows from the entrance port 81. The first inflow branch channel 82 is a channel for guiding the ink from the inflow channel of the entrance port 81 into the head main body 30. The second inflow branch channel 83 is a channel for guiding the ink from the inflow channel of the entrance port 81 into the cooling pipe 41.

The exit side flow channel member 90 is disposed at the other side (the −X side) in the X direction of the inkjet head 5. The exit side flow channel member 90 is provided with an exit port 91 to which the ink discharge tube 22 described above is coupled. The exit side flow channel member 90 is attached to the other side (the −X side) in the X direction of the head main body 30 via a fastener member such as a bolt.

The exit side flow channel member 90 has a first outflow branch channel 92 and a second outflow branch channel 93 branching from an outflow channel from which the ink outflows to the exit port 91. The first outflow branch channel 92 is a channel for guiding the ink from the inside of the head main body 30 to the outflow channel of the exit port 91. The second outflow branch channel 93 is a channel for guiding the ink from the inside of the cooling pipe 41 to the outflow channel of the exit port 91.

[Cooling Pipe 41]

The cooling pipe 41 has a corrosion resistance to the ink. Here, the corrosion resistance means a rate at which the corrosion progresses when an object is dipped into the ink. The cooling pipe 41 is higher in corrosion resistance compared to the cooling member 50. Here, the fact that the corrosion resistance is high means that the corrosion with respect to the ink progresses slowly. The cooling pipe 41 is formed of, for example, stainless steel.

It should be noted that the cooling pipe 41 can be formed of copper alloy, titanium alloy, nickel alloy, chromium alloy, or the like. It is preferable for the cooling pipe 41 to be formed of a material higher in corrosion resistance to the ink compared to the cooling member 50. For example, it is possible to change the constituent material of the cooling pipe 41 in accordance with a design specification.

The cooling pipe 41 branches from a flow channel (a liquid flow channel) of the entrance port 81 through which the ink passes. The cooling pipe 41 has a cooling flow channel 42 through which the ink as a cooling medium passes. The cooling flow channel 42 communicates with the second inflow branch channel 83 of the entrance side flow channel member 80, and the second outflow branch channel 93 of the exit side flow channel member 90.

For example, when activating the pressure pump 24 and the suction pump 25, the ink located in the ink tank 4 is transmitted to the head main body 30 and the cooling pipe 41 passing through the entrance part 81 of the entrance side flow channel member 80, the first inflow branch channel 82 and the second inflow branch channel 83 in this order. Subsequently, the ink is returned to the inside of the ink tank 4 passing through the first outflow branch channel 92 and the second outflow branch channel 93 of the exit side flow channel member 90, and the exit port 91 in this order.

The cooling pipe 41 is insert-molded with respect to the cooling member 50. Here, the insert molding means inserting a material around a component set in a mold and molding the component and the material as a single component. The cooling pipe 41 in the present embodiment is molded as a single component with the material of the cooling member 50 being inserted around the cooling pipe 41 set in a mold 100. The component obtained by integrating the cooling pipe 41 and the cooling member 50 with each other is hereinafter referred to as a "cooling unit 40."

Figure 6:
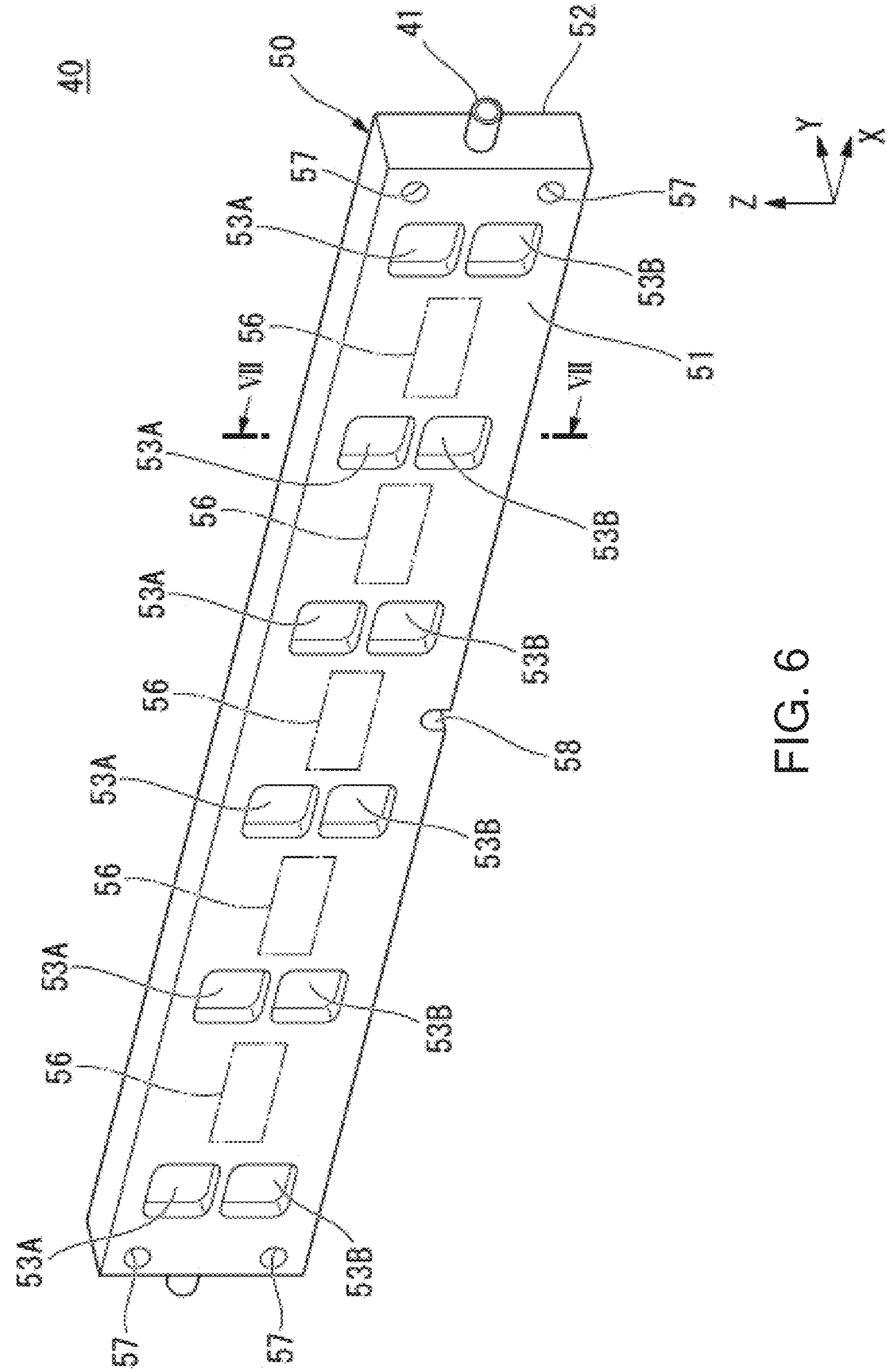
FIG. 6 is a perspective view of a cooling unit related to the embodiment.
Figure 7:
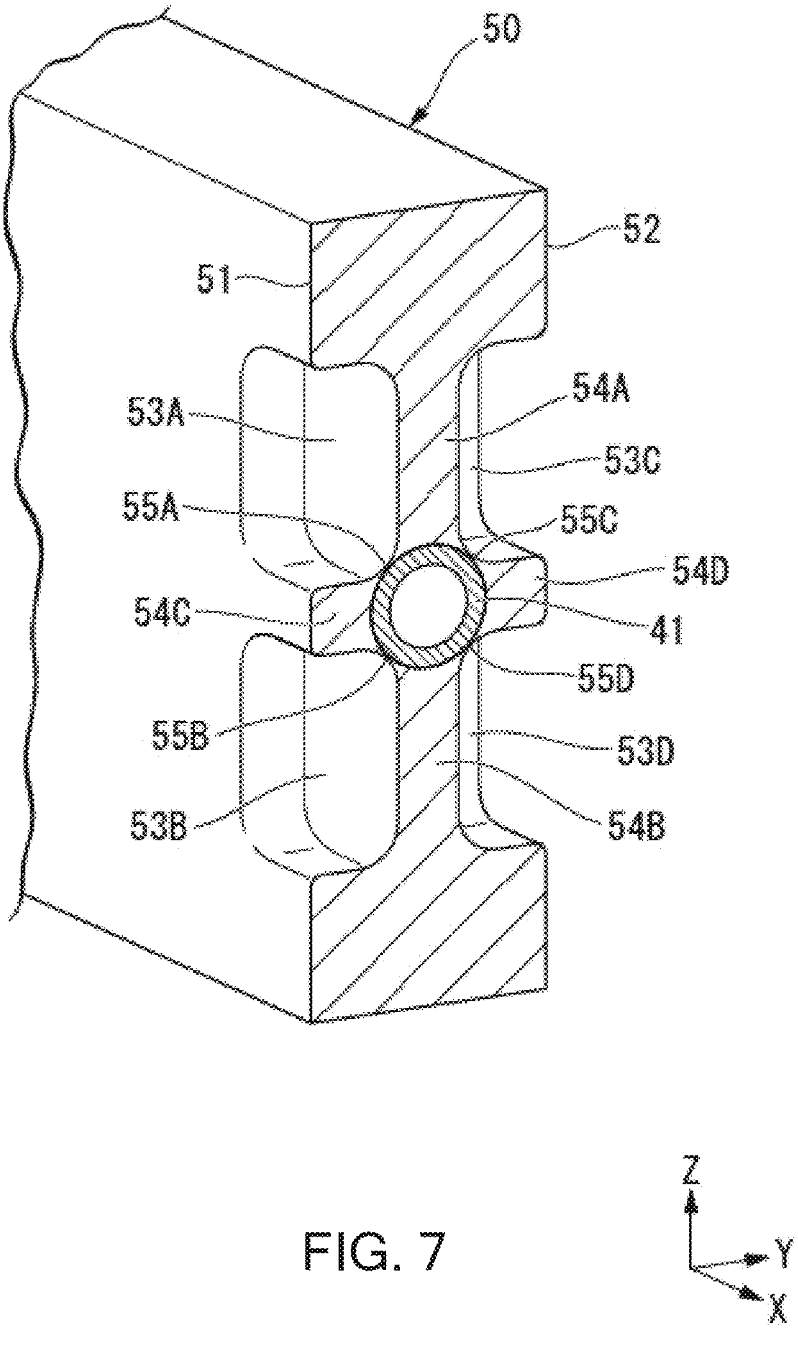
FIG. 7 is a cross-sectional perspective view along an arrow VII-VII shown in FIG. 6.
Figure 8:
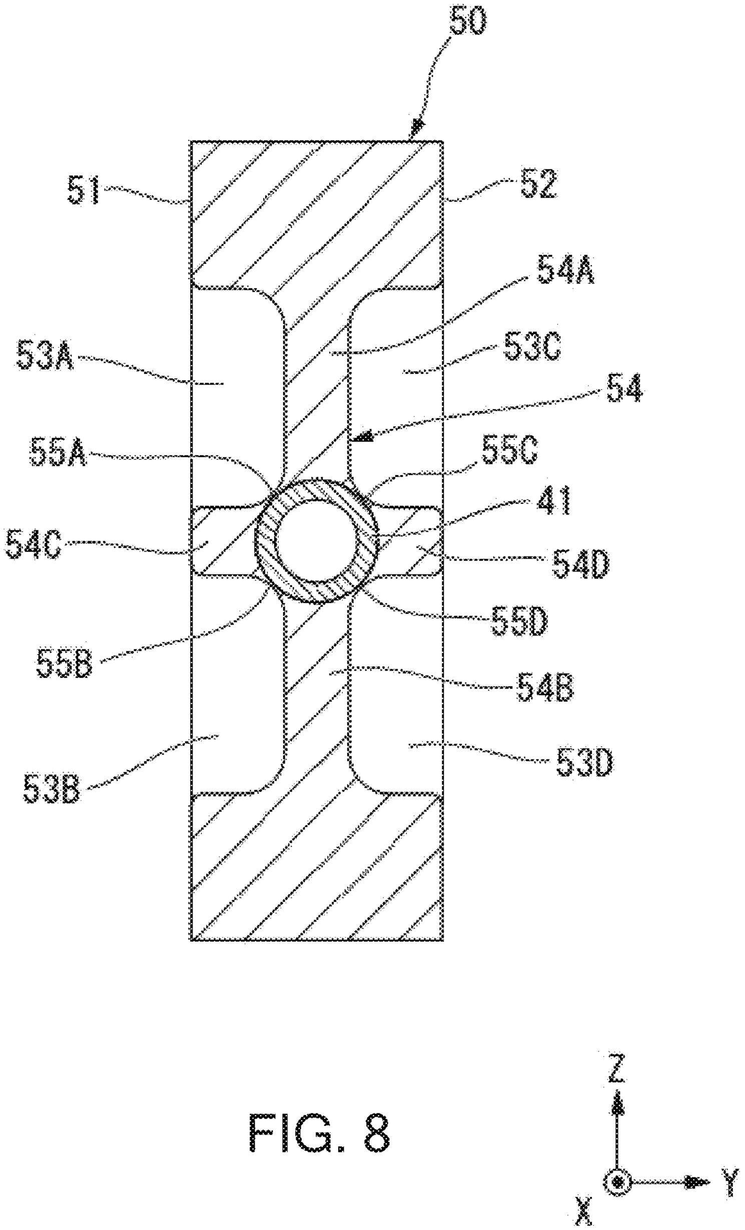
FIG. 8 is a cross-sectional view for explaining a recessed part of a cooling member related to the embodiment.

FIG. 6 is a perspective view of the cooling unit 40 related to the embodiment. FIG. 7 is a cross-sectional perspective view along an arrow VII-VII shown in FIG. 6. FIG. 8 is a cross-sectional view for explaining recessed parts 53A, 53B, 53C, and 53D of the cooling member 50 related to the embodiment.

As shown in these drawings, the cooling pipe 41 has a straight pipe shape. The cooling pipe 41 extends linearly along the X direction. The cooling pipe 41 has a cylindrical shape extending along the X direction.

End portions of the cooling pipe 41 are arranged outside an outer shape of the cooling member 50. One (a +X side end portion) of the end portions of the cooling pipe 41 is arranged outside (at the +X side of) one side surface (a +X side surface) of the cooling member 50. The other (a −X side end portion) of the end portions of the cooling pipe 41 is arranged outside (at the −X side of) the other side surface (a −X side surface) of the cooling member 50. A part (a part at a middle side in the X direction) other than the both end portions in the X direction in the cooling member 50 is embedded in the cooling member 50.

There is disposed the single cooling pipe 41 in the example shown in the drawing, but this is not a limitation. For example, there can be disposed a plurality of the cooling pipes 41. For example, it is possible to change the number of the cooling pipes 41 installed therein in accordance with the design specification.

The cross-sectional shape of the cooling pipe 41 (the shape of the cooling pipe 41 cut along the Y-Z plane) is the annular shape in the example shown in the drawings, but this is not a limitation. For example, the cross-sectional shape of the cooling pipe 41 can be a rectangular frame shape. For example, it is possible to change the cross-sectional shape of the cooling pipe 41 in accordance with the design specification.

[Cooling Member 50]

The cooling member 50 has higher thermal conductivity than that of the cooling pipe 41. The cooling member 50 is formed to have a rectangular solid shape having a longitudinal direction in the X direction. The cooling member 50 is formed of, for example, aluminum pure metal or aluminum alloy.

It should be noted that the cooling member 50 can also be formed of zinc alloy. It is preferable for the cooling member 50 to be formed of a material having higher thermal conductivity compared to that of the cooling pipe 41. For example, it is possible to change the constituent material of the cooling member 50 in accordance with the design specification.

The cooling member 50 has a first surface 51 (a −Y side surface) and a second surface 52 (a +Y side surface) arranged at respective sides opposite to each other across the cooling pipe 41. The first surface 51 is a surface along the X-Z plane at the −Y side of the cooling pipe 41. The second surface 52 is a surface along the X-Z plane at the +Y side of the cooling pipe 41.

The cooling member 50 has the recessed parts 53A, 53B, 53C, and 53D in at least a part of a portion surrounding the cooling pipe 41. The recessed parts 53A, 53B, 53C, and 53D open toward four directions crossing the central axis of the cooling pipe 41. The four directions are a direction at the +Z side and the −Y side, a direction at the −Z side and the −Y side, a direction at the +Z side and the +Z side, and a direction at the −Z side and the +Y side with respect to the central axis of the cooling pipe 41 when viewed from the X side.

The recessed parts 53A, 53B, 53C, and 53D opening toward the four directions are first upper recessed parts 53A formed at an upper side (the +Z side) of the first surface 51 of the cooling member 50, first lower recessed parts 53B formed at a lower side (the −Z side) of the first surface 51 of the cooling member 50, second upper recessed parts 53C formed at an upper side of the second surface 52 of the cooling member 50, and second lower recessed parts 53D formed at a lower side of the second surface 52 of the cooling member 50.

The first upper recessed parts 53A each open toward the direction of the +Z side and the −Y side with respect to the central axis of the cooling pipe 41 when viewed from the X direction.

The first lower recessed parts 53B each open toward the direction of the −Z side and the −Y side with respect to the central axis of the cooling pipe 41 when viewed from the X direction.

The second upper recessed parts 53C each open toward the direction of the +Z side and the +Y side with respect to the central axis of the cooling pipe 41 when viewed from the X direction.

The second lower recessed parts 53D each open toward the direction of the −Z side and the +Y side with respect to the central axis of the cooling pipe 41 when viewed from the X direction.

The cooling member 50 has a partition part 54 for partitioning the recessed parts 53A, 53B, 53C, and 53D respectively opening toward the four directions. The partition part 54 has an X shape crossing with respect to the central axis of the cooling pipe 41 when viewed from the X direction. The partition part 54 has an upper extending part 54A extending from the cooling pipe 41 toward the upper side (the +Z side), a lower extending part 54B extending from the cooling pipe 41 toward the lower side (the −Z side), a first surface side extending part 54C extending from the cooling pipe 41 toward the first surface 51 (the −Y side), and a second surface side extending part 54D extending from the cooling pipe 41 toward the second surface 52 (the +Y side) when viewed from the X direction.

The upper extending part 54A extends in the Z direction so as to partition the first upper recessed parts 53A and the second upper recessed parts 53C from each other when viewed from the X direction.

The lower extending part 54B extends in the Z direction so as to partition the first lower recessed parts 53B and the second lower recessed parts 53D from each other when viewed from the X direction.

The first surface side extending part 54C extends in the Y direction so as to partition the first upper recessed parts 53A and the first lower recessed parts 53B from each other when viewed from the X direction.

The second surface side extending part 54D extends in the Y direction so as to partition the second upper recessed parts 53C and the second lower recessed parts 53D from each other when viewed from the X direction.

The recessed parts 53A, 53B, 53C, and 53D respectively have curved parts 55A, 55B, 55C, and 55D curved toward the cooling pipe 41. The curved parts 55A, 55B, 55C, and 55D are each curved in an arc toward the outer circumferential surface of the cooling pipe 41 when viewed from the X direction.

The first upper recessed parts 53A each have a first upper curved part 55A curved toward the cooling pipe 41 at the +Y side and the −Z side when viewed from the X direction. The first upper curved parts 55A each smoothly connect the −Y side surface of the upper extending part 54A and the +Z side surface of the first surface side extending part 54C to each other.

The first lower recessed parts 53B each have a first lower curved part 55B curved toward the cooling pipe 41 at the +Y side and the +Z side when viewed from the X direction. The first lower curved parts 55B each smoothly connect the −Y side surface of the lower extending part 54B and the −Z side surface of the first surface side extending part 54C to each other.

The second upper recessed parts 53C each have a second upper curved part 55C curved toward the cooling pipe 41 at the −Y side and the −Z side when viewed from the X direction. The second upper curved parts 55C each smoothly connect the +Y side surface of the upper extending part 54A and the +Z side surface of the second surface side extending part 54D to each other.

The second lower recessed parts 53D each have a second lower curved part 55D curved toward the cooling pipe 41 at the −Y side and the +Z side when viewed from the X direction. The second lower curved parts 55D each smoothly connect the +Y side surface of the lower extending part 54B and the −Z side surface of the second surface side extending part 54D to each other.

The cooling member 50 has heat source arrangement surfaces 56 on which the drive circuits 35 are respectively arranged. In the example shown in the drawings, the heat source arrangement surfaces 56 are represented by dashed-dotted lines. The heat source arrangement surfaces 56 are disposed in other portions than the recessed parts 53A, 53B, 53C, and 53D in the cooling member 50.

In the example shown in the drawings, the recessed parts 53A, 53B, 53C, and 53D are each formed to have a rectangular shape having round corners when viewed from the Y direction. In the example shown in the drawings, six pairs of recessed parts arranged side by side in the Z direction (e.g., the first upper recessed parts 53A and the first lower recessed parts 53B) out of the recessed parts 53A, 53B, 53C, and 53D are arranged at intervals in the X direction. In the X direction, the recessed parts 53A, 53B, 53C, and 53D and the heat source arrangement surfaces 56 are alternately disposed. It should be noted that the shapes, the arrangement number, the arrangement places, and so on of the recessed parts 53A, 53B, 53C, and 53D are not limited to the above, and can be changed in accordance with the design specification.

The heat source arrangement surfaces 56 are each a plane. The heat source arrangement surfaces 56 are disposed along the X-Z plane. The heat source arrangement surfaces 56 overlap the cooling pipe 41. For example, it is preferable for the heat source arrangement surface 56 to have a larger outer shape than the outer shape of the drive circuit 35 when viewed from the Y direction. For example, when the drive circuit 35 has a rectangular shape when viewed from the Y direction, it is preferable for the heat source arrangement surface 56 to have a rectangular shape larger than the outer shape of the drive circuit 35. In the example shown in the drawings, the heat source arrangement surfaces 56 are arranged at five places at intervals in the X direction in a portion other than the pairs of recessed parts 53A, 53B, 53C, and 53D each arranged side by side in the Z direction in the cooling member 50.

The heat source arrangement surfaces 56 are disposed in each of the first surface 51 and the second surface 52 of the cooling member 50. For example, the heat source arrangement surfaces 56 are arranged at five places (totally ten places in both of the first surface 51 and the second surface 52) at intervals in the X direction in other portion than the pairs of recessed parts 53A, 53B, 53C, and 53D each arranged side by side in the Z direction on each of the first surface 51 and the second surface 52 of the cooling member 50. It should be noted that the shapes, the arrangement number, the arrangement places, and so on of the heat source arrangement surfaces 56 are not limited to the above, and can be changed in accordance with the design specification.

At an X-direction end portion side of the cooling member 50, there are formed the pair of through holes 57 which are arranged vertically, and which open in the Y direction. At an X-direction center lower side of the cooling member 50, there is formed the lower middle recessed part 58 recessed toward the +Z side from the lower surface of the cooling member 50. The through holes 57 and the lower middle recessed part 58 are portions through which the screws for fixing the pair of support members 70 pass. In the example shown in the drawings, the cooling member 50 is fixed to the pair of support members 70 via the screws at two places arranged vertically at each of the both ends in the X direction, and a single place of the X-direction center lower side, totally five places.

[Method of Manufacturing Inkjet Head 5]

A method of manufacturing the inkjet head 5 according to the present embodiment is a method of manufacturing the inkjet head 5 provided with the head main body 30 for jetting the ink, the cooling pipe 41 which has the corrosion resistance to the ink, and through which the ink for cooling the drive circuits 35 passes, and the cooling member 50 having higher thermal conductivity than that of the cooling pipe 41, wherein the cooling member 50 is molded in the state of supporting the cooling pipe 41 in the step of manufacturing the cooling member 50.

The method of manufacturing the inkjet head includes a head main body preparation step of preparing the head main body 30, a cooling unit manufacturing step (a step of manufacturing the cooling member 50) of manufacturing the cooling unit 40, and a unit coupling step of coupling the head main body 30 and the cooling unit 40 to each other.

In the head main body preparation step, there is prepared the head main body 30 including the actuator plate, the nozzle plate, and so on described above. After the head main body preparation step, there is made the transition to the cooling unit manufacturing step.

Figure 9:
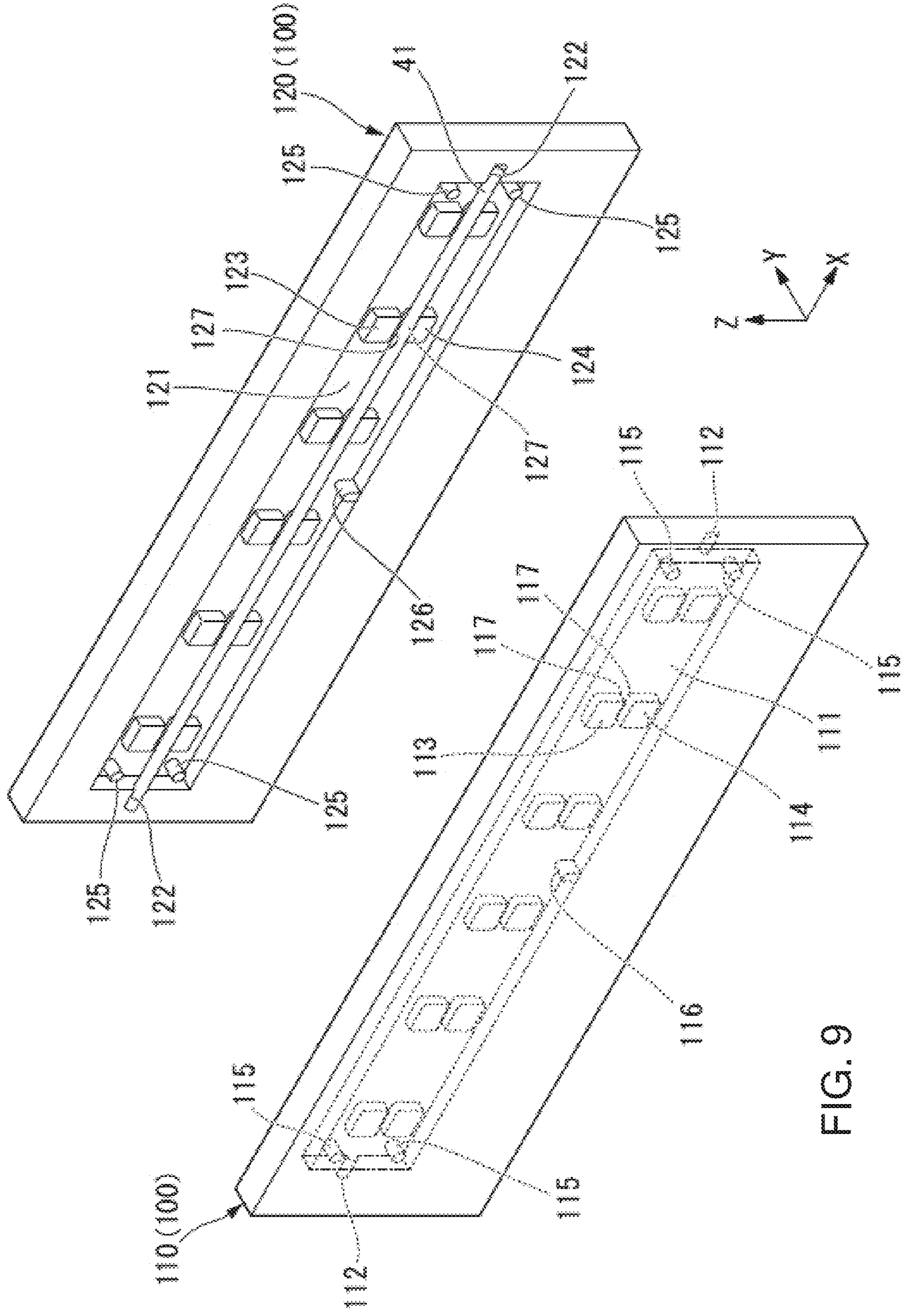
FIG. 9 is an explanatory diagram showing a cooling unit manufacturing step related to the embodiment.

FIG. 9 is an explanatory diagram showing the cooling unit manufacturing step related to the embodiment.

In the cooling unit manufacturing step, there are prepared a pair of metal molds 110, 120 constituting the mold 100 for manufacturing the cooling unit 40, and the cooling pipe 41 constituting the cooling unit 40. In the example shown in the drawings, the pair of metal molds 110, 120 correspond to a first metal mold 110 corresponding to a −Y side portion of the cooling unit 40, and a second metal mold 120 corresponding to a +Y side portion of the cooling unit 40.

The first metal mold 110 has a first main body recessed part 111 recessed along an outer shape of the −Y side portion of the cooling member 50, and a first end side recessed part 112 recessed along an outer shape of an X-direction outer side portion of a −Y side portion of the cooling pipe 41. The first main body recessed part 111 and the first end side recessed part 112 are recessed toward the −Y side from the +Y side surface (a matching surface with the second metal mold 120) of the first metal mold 110. The first end side recessed part 112 extends toward the outer side in the X direction from the both side surfaces in the X direction of the first main body recessed part 111.

The first metal mold 110 has first upper protruding parts 113 and first lower protruding parts 114, pairs of first end side protruding parts 115, and a first lower middle protruding part 116, wherein the first upper protruding parts 113 and the first lower protruding parts 114 protrude along the outer shapes of the first upper recessed parts 53A and the first lower recessed parts 53B of the cooling member 50, the pairs of first end side protruding parts 115 protrude along the outer shapes of the −Y side portion of the pairs of through holes 57 at both end sides in the X direction of the cooling member 50, and the first lower middle protruding part 116 protrudes along the outer shape of the −Y side portion of the lower middle recessed part 58 of the cooling member 50.

The first upper protruding parts 113, the first lower protruding parts 114, the first end side protruding parts 115, and the first lower middle protruding part 116 protrude toward the +Y side from the −Y side surface (the bottom surface) of the first main body recessed part 111. The first upper protruding parts 113 and the first lower protruding parts 114 have first curved parts 117 curved along the outer shapes of the curved parts 55A, 55B of the first upper recessed parts 53A and the first lower recessed parts 53B, respectively. The first lower middle protruding part 116 protrudes toward the +Z side from the −Z side surface of the first main body recessed part 111.

The second metal mold 120 has a second main body recessed part 121 recessed along an outer shape of the +Y side portion of the cooling member 50, and second end side recessed parts 122 recessed along an outer shape of an X-direction outer side portion of a +Y side portion of the cooling pipe 41. The second main body recessed part 121 and the second end side recessed parts 122 are recessed toward the +Y side from the −Y side surface (a matching surface with the first metal mold 110) of the second metal mold 120. The second end side recessed parts 122 extend toward the outer side in the X direction from the both side surfaces in the X direction of the second main body recessed part 121.

The second metal mold 120 has second upper protruding parts 123 and second lower protruding parts 124, pairs of second end side protruding parts 125, and a second lower middle protruding part 126, wherein the second upper protruding parts 123 and the second lower protruding parts 124 protrude along the outer shapes of the second upper recessed parts 53C and the second lower recessed parts 53D of the cooling member 50, the pairs of second end side protruding parts 125 protrude along the outer shapes of the +Y side portions of the pairs of through holes 57 at both end sides in the X direction of the cooling member 50, and the second lower middle protruding part 126 protrudes along the outer shape of the +Y side portion of the lower middle recessed part 58 of the cooling member 50.

The second upper protruding parts 123, the second lower protruding parts 124, the second end side protruding parts 125, and the second lower middle protruding part 126 protrude toward the −Y side from the +Y side surface (the bottom surface) of the second main body recessed part 121. The second upper protruding parts 123 and the second lower protruding parts 124 have second curved parts 127 curved along the outer shapes of the curved parts 55C, 55D of the second upper recessed parts 53C and the second lower recessed parts 53D, respectively. The second lower middle protruding part 126 protrudes toward the +Z side from the −Z side surface of the second main body recessed part 121.

Then, one (the second metal mold 120 in the example shown in the drawings) of the pair of metal molds is made to support the cooling pipe 41. In the example shown in the drawings, both side portions in the X direction of the cooling pipe 41 are inserted in the second end side recessed parts 122 of the second metal mold 120. Thus, an X-direction central side portion of the cooling pipe 41 is supported by the second upper protruding parts 123 and the second lower protruding parts 124. On this occasion, the X-direction central side portion of the cooling pipe 41 has contact (line contact or point contact) with the second curved parts 127 of the second upper protruding parts 123 and the second lower protruding parts 124.

Then, the first metal mold 110 and the second metal mold 120 are joined. For example, the matching surface of the first metal mold 110 and the matching surface of the second metal mold 120 are made to have contact with each other. Thus, the X-direction central side portion of the cooling pipe 41 is also supported by the first upper protruding parts 113 and the first lower protruding parts 114. On this occasion, the X-direction central side portion of the cooling pipe 41 has contact (line contact or point contact) with the first curved parts 117 of the first upper protruding parts 113 and the first lower protruding parts 114. Therefore, the X-direction central side portion of the cooling pipe 41 is supported by the first upper protruding parts 113, the first lower protruding parts 114, the second upper protruding parts 123, and the second lower protruding parts 124. The first upper protruding parts 113, the first lower protruding parts 114, the second upper protruding parts 123, and the second lower protruding parts 124 turn to be a pipe supporting part (a part for supporting the cooling pipe 41) when performing the molding. When performing the molding, the X-direction central side portion of the cooling pipe 41 has contact (line contact or point contact) with the first curved parts 117 and the second curved parts 127.

Then, molten aluminum (about 680° C.) is poured into the mold 100. For example, in the state in which the first metal mold 110 and the second metal mold 120 are combined with each other, the molten metal described above is poured into an internal space (around the cooling pipe 41) through a hole not shown. In the cooling unit manufacturing step, the molding is performed in the state of supporting the cooling pipe 41. After the molding, the mold 100 is separated. Thus, the cooling unit 40 having the cooling pipe 41 and the cooling member 50 integrated with each other is obtained. After the cooling unit manufacturing step, there is made the transition to the unit coupling step.

In the unit coupling step, the board unit 60, the support member 70, the flow channel members 80, 90, and so on described above are coupled to the head main body 30 and the cooling unit 40 with coupling members, fastening members, or the like not shown. Due to the steps described hereinabove, the inkjet head 5 is obtained.

[Functions and Advantages]

The inkjet head 5 according to the present embodiment is provided with the head main body 30 for jetting the ink, the cooling pipe 41 which has the corrosion resistance to the ink, and through which the ink for cooling the drive circuits 35 passes, and the cooling member 50 which has higher thermal conductivity than that of the cooling pipe 41, in which at least a part of the cooling pipe 41 is embedded, and which has the recessed parts 53A, 53B, 53C, and 53D in at least a part of the portion surrounding the cooling pipe 41.

According to this configuration, there is provided the cooling member 50 in which at least a part of the cooling pipe 41 is embedded, and thus, the gap is difficult to occur between the cooling pipe 41 and the cooling member 50, and therefore, it becomes easy to transfer the heat from the cooling pipe 41 to the cooling member 50. Therefore, it is possible to increase the cooling efficiency.

In addition, the portion corresponding to the pipe supporting part (the part for supporting the cooling pipe 41) of the mold 100 when performing the molding appears as the recessed parts 53A, 53B, 53C, and 53D of the cooling member 50. Therefore, it is possible to prevent a misalignment and a deformation when performing the molding.

In the inkjet head 5 according to the present embodiment, the cooling pipe 41 is insert-molded with respect to the cooling member 50.

According to this configuration, since it is difficult to generate a gap between the cooling pipe 41 and the cooling member 50 due to the insert molding, it becomes easy to transfer the heat from the cooling pipe 41 to the cooling member 50. Therefore, it is possible to increase the cooling efficiency.

In the inkjet head 5 according to the present embodiment, the recessed parts 53A, 53B, 53C, and 53D open toward the four directions crossing the central axis of the cooling pipe 41.

According to this configuration, the portion corresponding to the pipe supporting part of the mold 100 when performing the molding appears as the recessed parts 53A, 53B, 53C, and 53D opening toward the four directions in the cooling member 50. Therefore, it is possible to more effectively prevent the misalignment and the deformation when performing the molding.

In the inkjet head 5 according to the present embodiment, the cooling member 50 has the partition part 54 for partitioning the recessed parts 53A, 53B, 53C, and 53D respectively opening toward the four directions.

According to this configuration, even when the cooling member 50 has the recessed parts 53A, 53B, 53C, and 53D opening toward the four directions, it is possible to ensure the heat transfer paths in the partition part 54, and therefore, it is possible to more effectively increase the cooling efficiency.

In the inkjet head 5 according to the present embodiment, the recessed parts 53A, 53B, 53C, and 53D respectively have the curved parts 55A, 55B, 55C, and 55D curved toward the cooling pipe 41.

For example, when there is a gap between the pipe supporting part of the mold 100 and the cooling pipe 41 when performing the molding, there is a possibility that burrs occur due to the molten metal flowing through the gap. In this case, when the recessed part has the curved part curved along the cooling pipe 41, it becomes easy to increase the contact portion (form the surface contact) between the pipe supporting part of the mold 100 and the cooling pipe 41 when performing the molding, and therefore, there is a high possibility that the burrs occur. In contrast, according to the present configuration, since the recessed parts 53A, 53B, 53C, and 53D have the curved parts 55A, 55B, 55C, and 55D curved toward the cooling pipe 41, it is possible to decrease the contact portion (form the line contact or the point contact) between the pipe supporting part of the mold 100 and the cooling pipe 41 when performing the molding. Therefore, it is possible to prevent the burrs from occurring.

In the inkjet head 5 according to the present embodiment, the cooling member 50 has the heat source arrangement surfaces 56 on which the drive circuits 35 are arranged, and the heat source arrangement surfaces 56 are disposed in a portion other than the recessed parts 53A, 53B, 53C, and 53D in the cooling member 50.

According to this configuration, since it is possible to make the drive circuits 35 have contact with the heat source arrangement surfaces 56 of the cooling member 50, it is possible to more effectively increase the cooling efficiency.

In the inkjet head 5 according to the present embodiment, the heat source arrangement surfaces 56 are each a plane.

According to this configuration, since it is possible to increase the contact area between the drive circuits 35 and the heat source arrangement surfaces 56 when a plane is included in the outer surface of the drive circuits 35, it is possible to more effectively increase the cooling efficiency.

In the inkjet head 5 according to the present embodiment, the cooling member 50 has the first surface 51 and the second surface 52 arranged at the respective sides opposite to each other across the cooling pipe 41, and the heat source arrangement surfaces 56 are disposed in each of the first surface 51 and the second surface 52.

According to this configuration, since it is possible to make the drive circuits 35 have contact with each of the first surface 51 and the second surface 52 of the cooling member 50 when disposing the plurality of drive circuits 35, it is possible to more effectively increase the cooling efficiency.

In the inkjet head 5 according to the present embodiment, the end portions of the cooling pipe 41 are arranged outside the outer shape of the cooling member 50.

According to this configuration, since it is possible to hold the end portions of the cooling pipe 41 when performing the molding, it is possible to prevent the misalignment and the deformation.

In the inkjet head 5 according to the present embodiment, the cooling pipe 41 has a straight pipe shape.

According to this configuration, it is easy to ensure the dimensional accuracy of the cooling pipe 41 compared to when the cooling pipe 41 has a curved shape, and thus, it is possible to achieve reduction in manufacturing cost.

In the inkjet head 5 according to the present embodiment, the cooling pipe 41 is formed of stainless steel, and the cooling member 50 is formed of aluminum pure metal or aluminum alloy.

According to this configuration, when the ink passes through the cooling pipe 41, it is possible to obtain high cooling efficiency while avoiding the corrosion by the ink.

In the inkjet head 5 according to the present embodiment, the cooling pipe 41 has the cooling flow channel 42, the cooling flow channel 42 branches from the ink flow channel through which the ink passes, and the ink as the cooling medium passes through the cooling flow channel 42.

According to this configuration, it is possible to supply the ink to the ink flow channel, and at the same time, supply the ink to the cooling flow channel 42 as the cooling medium.

The inkjet head 5 according to the present embodiment is provided with the head main body 30 for jetting the ink, the cooling pipe 41 which has the corrosion resistance to the ink, and through which the ink for cooling the drive circuits 35 passes, and the cooling member 50 which has higher thermal conductivity than that of the cooling pipe 41, and in which at least a part of the cooling pipe 41 is insert-molded.

According to this configuration, since it is difficult to generate a gap between the cooling pipe 41 and the cooling member 50 due to the insert molding, it becomes easy to transfer the heat from the cooling pipe 41 to the cooling member 50. Therefore, it is possible to increase the cooling efficiency.

The printer 1 according to the present embodiment is provided with the inkjet heads 5 described above, and the carriage 29 to which the inkjet heads 5 are attached.

According to this configuration, it is possible to obtain the printer 1 capable of increasing the cooling efficiency of the inkjet heads 5.

A method of manufacturing the inkjet head 5 according to the present embodiment is a method of manufacturing the inkjet head 5 provided with the head main body 30 for jetting the ink, the cooling pipe 41 which has the corrosion resistance to the ink, and through which the ink for cooling the drive circuits 35 passes, and the cooling member 50 having higher thermal conductivity than that of the cooling pipe 41, wherein the cooling member 50 is molded in the state of supporting the cooling pipe 41 in the step of manufacturing the cooling member 50.

According to this manufacturing method, the molding is performed in the state of supporting the cooling pipe 41, and thus, the gap is difficult to occur between the cooling pipe 41 and the cooling member 50, and therefore, it becomes easy to transfer the heat from the cooling pipe 41 to the cooling member 50. Therefore, it is possible to increase the cooling efficiency. In addition, it is possible to prevent the misalignment and the deformation when performing the molding.

Although the preferred embodiment of the present disclosure is hereinabove described, it should be understood that this is an illustrative description of the present disclosure, and should not be considered as a limitation. Modification such as addition, omission, and displacement can be implemented within the scope or the spirit of the present disclosure. Therefore, the present disclosure should not be assumed to be limited by the above description, but is limited by the appended claims.

Modified Examples

For example, in the embodiment described above, there is illustrated the configuration in which the recessed parts open toward the four directions crossing the central axis of the cooling pipe, but this configuration is not a limitation. For example, the recessed parts can open toward three or less, or five or more directions crossing the central axis of the cooling pipe. For example, it is possible to change the directions in which the recessed parts open in accordance with the design specification.

For example, in the embodiment described above, there is illustrated the configuration in which the cooling member has the partition part for partitioning the recessed parts opening toward the four directions, but this configuration is not a limitation. For example, the cooling member can have a partition part for partitioning the recessed parts opening toward three or less, or five or more directions. For example, the cooling member is not required to have the partition part. For example, it is possible to change the installation aspect of the partition part in accordance with the design specification.

For example, in the embodiment described above, there is illustrated the configuration in which the recessed parts each have the curved part curved toward the cooling pipe, but this configuration is not a limitation. For example, the recessed parts can each have a curved part curved along the cooling pipe. For example, the recessed parts can each have a curved part curved toward an opposite side to the cooling pipe. For example, the recessed parts can each have a corner part protruding toward the cooling pipe. For example, the recessed parts are not required to have the curved part. For example, it is possible to change the configuration aspect of the recessed parts in accordance with the design specification.

For example, in the embodiment described above, there is illustrated the configuration in which the cooling member has the heat source arrangement surfaces on which the drive circuits are arranged, and the heat source arrangement surfaces are disposed in the portion other than the recessed parts in the cooling member, but this configuration is not a limitation. For example, the heat source surfaces can be disposed in the recessed parts of the cooling member. For example, it is possible to change the installation aspect of the heat source arrangement surfaces in accordance with the design specification.

For example, in the embodiment described above, there is illustrated the configuration in which the heat source arrangement surfaces are each a plane, but this configuration is not a limitation. For example, the heat source arrangement surfaces can each include a curved surface. For example, the heat source arrangement surfaces can each have a shape along one of the surfaces of the drive circuit. For example, it is possible to change the configuration aspect of the heat source arrangement surfaces in accordance with the design specification.

For example, in the embodiment described above, there is illustrated the configuration in which the cooling member has the first surface and the second surface arranged at respective sides opposite to each other across the cooling pipe, and the heat source arrangement surfaces are disposed on each of the first surface and the second surface, but this configuration is not a limitation. For example, the heat source arrangement surfaces can be disposed on either one of the first surface and the second surface (a single side). For example, it is possible to change the installation aspect of the heat source arrangement surfaces in accordance with the design specification.

For example, in the embodiment described above, there is illustrated the configuration in which the end portions of the cooling pipe are arranged outside the outer shape of the cooling member, but this configuration is not a limitation. For example, the end portions of the cooling pipe can be arranged inside or coplanar with the outer shape of the cooling member. For example, it is possible to change the arrangement aspect of the end portions of the cooling pipe in accordance with the design specification.

For example, in the embodiment described above, there is illustrated the configuration in which the cooling pipe has the straight pipe shape, but this configuration is not a limitation. For example, the cooling pipe can have a curved shape. For example, the cooling pipe can include a straight part and a curved part. For example, it is possible to change the shape of the cooling pipe in accordance with the design specification.

For example, in the embodiment described above, there is illustrated the configuration in which the cooling pipe is formed of stainless steel, and the cooling member is formed of aluminum pure metal or aluminum alloy, but this configuration is not a limitation. For example, the cooling pipe can be formed of copper alloy, titanium alloy, nickel alloy, chromium alloy, or the like, and the cooling member can be formed of zinc alloy or the like. For example, it is possible to change the constituent materials of the cooling pipe and the cooling member in accordance with the design specification.

For example, in the embodiment described above, there is illustrated the configuration in which the cooling member has the recessed parts in at least a part of the portion surrounding the cooling pipe, but this configuration is not a limitation. For example, the cooling member is not required to have the recessed parts. For example, it is sufficient to embed at least a part of the cooling pipe in the cooling member using the insert molding or the like. For example, it is possible to change the installation aspect of the recessed parts in accordance with the design specification.

Figure 10:
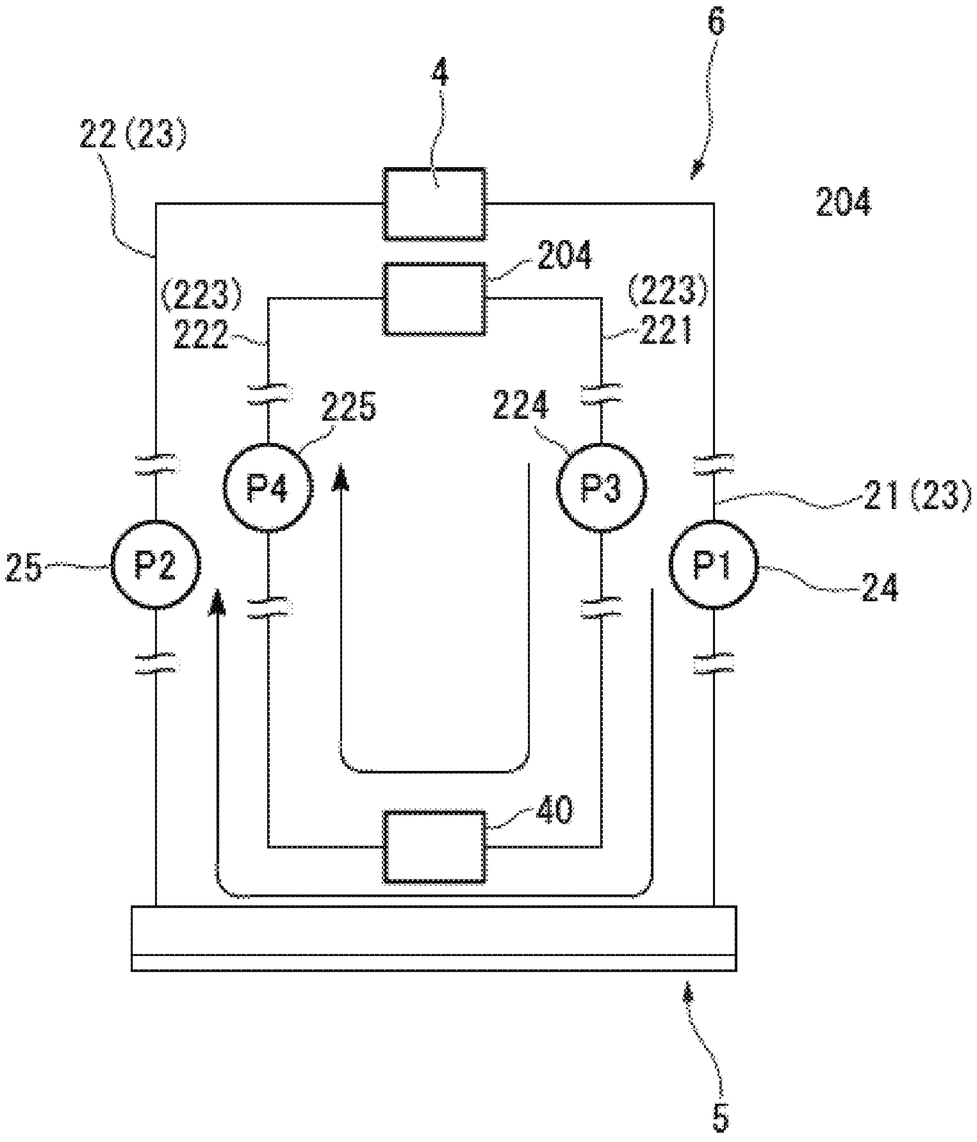
FIG. 10 is a schematic diagram for explaining a modified example of a flow of the ink and a cooling medium related to the embodiment.

For example, in the embodiment described above, there is illustrated the configuration in which the cooling pipe branches from the ink flow channel through which the ink passes, and has the cooling flow channel through which the ink passes as the cooling medium, but this configuration is not a limitation. For example, the ink is not required to pass through the cooling flow channel. For example, it is possible to adopt a configuration in which the ink is supplied to the ink flow channel, and at the same time, a cooling medium other than the ink is supplied to the cooling flow channel. For example, as shown in FIG. 10, there can be adopted a configuration in which the ink retained in the ink tank 4 is fed to the inkjet head 5 via the ink supply tube 21, and further, the ink is returned to the inside of the ink tank 4 via the ink discharge tube 22 by activating the pressure pump 24 and the suction pump 25, and a configuration in which a cooling medium retained in a cooling medium tank 204 is fed to the inside of the cooling unit 40 via a cooling medium supply tube 221, and further, the cooling medium is returned to the inside of the cooling medium tank 204 via a cooling medium discharge tube 222 by activating a pressure pump 224 and a suction pump 225. As described above, it is possible to form a circulation channel 223 for the cooling medium separately from the circulation channel 23 for the ink. For example, it is possible to change the aspect of the flow channels for the ink and the cooling medium in accordance with the design specification.

Further, for example, in the embodiment described above, the description is presented citing the inkjet printer as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction to a direction along the horizontal direction.

What is claimed is:

1. A liquid jet head comprising:
a jet section configured to jet liquid;
a drive circuit operable to drive the jet section to jet the liquid;
a cooling pipe which has corrosion resistance to the liquid, wherein the cooling pipe is configured to pass a cooling medium through the cooling pipe; and
a cooling member which has higher thermal conductivity than thermal conductivity of the cooling pipe, wherein the cooling pipe is insert-molded in the cooling member, and the cooling member is in direct contact with the drive circuit in a vicinity of the cooling pipe, and further wherein the cooling member has at least one recessed part formed to at least partially surround the cooling pipe.

2. The liquid jet head according to claim 1, wherein the recessed parts respectively open toward four directions crossing a central axis of the cooling pipe.

3. The liquid jet head according to claim 2, wherein the cooling member has a partition part configured to partition the recessed parts respectively opening toward the four directions.

4. The liquid jet head according to claim 1, wherein the recessed part includes a curved part curved toward the cooling pipe.

5. The liquid jet head according to claim 1, wherein
the cooling member has at least one heat source arrangement surface on which the heat source is arranged, and
the heat source arrangement surface is disposed in a portion other than the recessed part in the cooling member.

6. The liquid jet head according to claim 5, wherein the heat source arrangement surface is a plane.

7. The liquid jet head according to claim 5, wherein
the cooling member has a first surface and a second surface which are arranged at respective sides opposite to each other across the cooling pipe, and
the heat source arrangement surface is provided to each of the first surface and the second surface.

8. The liquid jet head according to claim 1, wherein an end portion of the cooling pipe is arranged outside an outer shape of the cooling member.

9. The liquid jet head according to claim 1, wherein the cooling pipe has a straight pipe shape.

10. The liquid jet head according to claim 1, wherein
the cooling pipe is formed of stainless steel, and
the cooling member is formed of aluminum pure metal or aluminum alloy.

11. The liquid jet head according to claim 1, wherein the cooling pipe branches from a liquid flow channel through which the liquid passes, and has a cooling flow channel through which the liquid passes as the cooling medium.

12. A liquid jet recording device comprising:
the liquid jet head according to claim 1; and
a carriage to which the liquid jet head is attached.

13. A method of manufacturing a liquid jet head, comprising:
providing a jet section configured to jet liquid;
providing a cooling pipe which has corrosion resistance to the liquid, wherein the cooling pipe is configured to pass a cooling medium through the cooling pipe; and
providing a cooling member having higher thermal conductivity than thermal conductivity of the cooling pipe, wherein molding the cooling member around the cooling pipe while supporting the cooling pipe.

* * * * *